J. Swartz.

Mower.

No. 970. Reissued June. 5. 1860.

Witnesses.

Jacob Swartz

Henry A. Swartz

Abram S. Swartz

UNITED STATES PATENT OFFICE.

JACOB SWARTZ, OF BUFFALO, NEW YORK.

IMPROVEMENT IN GRAIN AND GRASS HARVESTERS.

Specification forming part of Letters Patent No. 11,951, dated November 14, 1854; Reissue No. 970, dated June 5, 1860.

*To all whom it may concern:*

Be it known that I, JACOB SWARTZ, of the city of Buffalo, county of Erie, and State of New York, have invented certain new and useful Improvements in Harvesting-Machines; and I do hereby declare that the following is a full and exact description thereof, reference being had to the accompanying drawings, and to the letters of reference marked thereon.

My invention relates to that kind of harvesting-machine in which the heel of the guard-finger bar is attached to the main frame (which carries the cutters' driving crank-shaft) by a hinged or adjustable coupling arm or arms, which carry said heel in an arc when its vertical position is varied, while the main frame occupies the same horizontal plane or vertical position; and my invention consists in a reorganization of and substitution of different and additions of new parts in the machine, designed to effect important benefits in its operation and advantages in its uses, and all of which one fully and clearly set forth in the following description.

Figure 1:
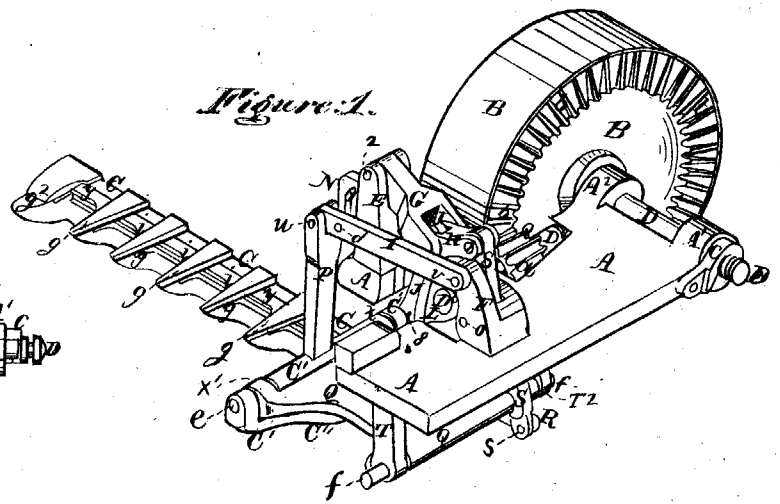
Figure 3:
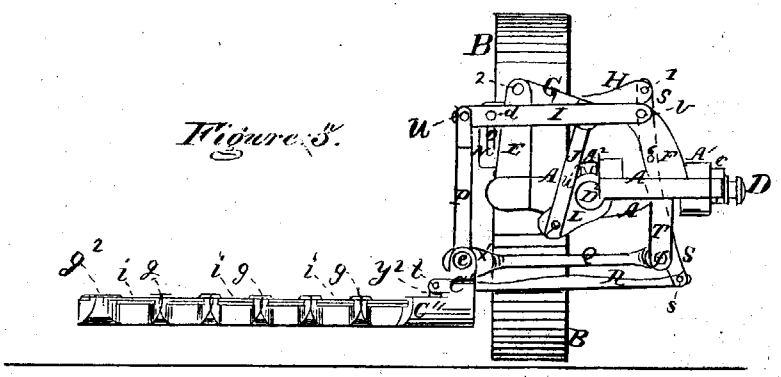
Figure 2:
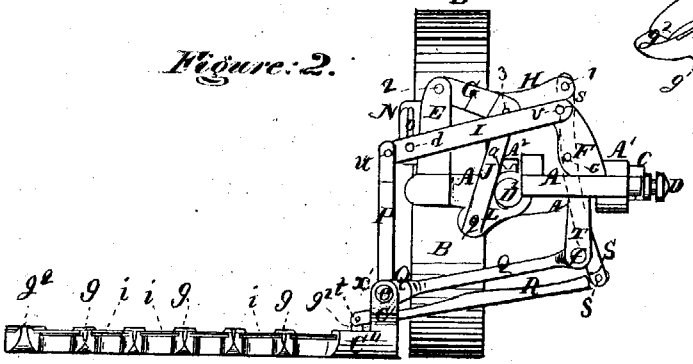

In the accompanying drawings, forming part of this specification, Figure 1 represents a perspective view of my improved machine. Fig. 2 represents a front elevation of the same, showing the cutting apparatus down on the ground for mowing; and Fig. 3 represents a similar elevation with the finger-bar held above the ground, as for reaping.

Similar letters denote the same parts in the different views.

A is the main frame of the machine, and B is the main driving and supporting wheel, which is hung on a horizontally-arranged shaft, D, hung in suitable boxes, $A'$ and $A^2$, at the rear side of the frame A.

On one face or side of the wheel B is formed or arranged the main driving-gear *b*, (see Fig. 1,) which drives a bevel-pinion, *a*, on shaft $D^2$. This shaft is arranged in proper bearings near the inner side of the frame A, and has fastened on its forward end the main driving-crank L, from which motion is imparted to the reciprocating cutter-bar Y through the medium which will be understood by the following description, viz: On each side of the forward end of the shaft $D^2$ is arranged an upright stand or post, E and F, fast to the main frame A. In the upper end of one of these stands, E, is pivoted, at 2, one end of a short arm or bar, G, and near the bottom of the other stand, F, is pivoted, at 6, a lever, S. To the upper end of lever or arm S is pivoted, at 1, one end of a short arm, H, which is connected by a pivot, 3, to the end of arm G, and the same pin 3 couples to the two adjacent ends of arm G and H one end of pitman J, which is connected at its other end to the wrist-pin 9 of crank L, and to the lower end of lever S is pivoted one end of a pitman, R. The object of attaching this end of the pitman some distance below the frame is that it shall be more nearly parallel (horizontally) with the cutter-bar than in this class of harvesting-machines as they have been constructed heretofore, by which arrangement the heel of the cutter-bar (when its vertical position is varied) moves more nearly in a perpendicular line than it otherwise would. The other end of pitman R is attached to the heel of the cutter-bar, and is farther above the heel of the cutter-bar than as heretofore in this class of harvesters, for the double purpose of keeping the pitman more nearly in a horizontal position, and also for raising this end of it above the mown grass to prevent its entanglement with the grass while passing over it. The pitman, being nearly parallel with the cutter-bar, vibrates said bar and cutters with less power than when at a greater angle to it. It will now be seen that as the shaft D rotates its crank will cause the pitman J to vibrate the pin 3 up and down in the arc of a circle struck from the pin 2, and that this causes the pin 1 to swing in the arc of a circle struck from the pin 6, and also the lower end of the arm S to vibrate in the arc of a circle struck from said pin 6, which will cause the pitman R to reciprocate the cutter-bar Y.

C is the finger-bar, and *g* its fingers, and $g^2$ the divider, which is made wider and extends farther forward than one of the fingers for separating and dividing that to be cut from that to be left standing.

C is the finger-bar, which has a shoe or shield, $C'$, permanently attached to or formed on its heel or end adjacent to the main frame. Said shoe or shield has formed in it a guide for the heel of the cutter-bar when vibrating, and extends no farther from the fingers than does the heel of the finger-bar, and also runs forward of and extends above the points of the fingers for pressing down the cut grass when passing over it while the machine is used as a mower, and preventing its entanglement by the heel of the cutter or finger-bar.

C″ shows the upward slope of the end of the finger-bar where it connects with this shoe or shield at Fig. 1. In the upper portion of shoe C′ are formed cavities to receive ears *x x′*, that project from the yielding or adjustable coupling-arm Q, and said shoe is connected, after the fashion of two parts of a hinge, with said bar Q by a stud or arbor, *e*, (see Figs. 1 and 2,) which runs at right angles to the line of the finger-bar C and coupling-arm Q, but parallel (horizontally) with them, for permitting the finger-bar's fingers to always retain a horizontal position while having their vertical position varied.

P is a post or bar connected to the shoe C′ at its lower end, and coupled at its upper by a pin, *u*, to the vibrating end of arm I, whose other end is pivoted at *r* to the stationary post F.

The hinged or adjustable coupling-arm Q, which is hinged to the finge-bar at one end, as already described, is hung at its other end on a shaft or arbor, *f*, supported in the arms T and T, which extend down from the main frame A the proper distance to have the shaft or arbor *f* at the proper relative place with that of arbor *e*, and its distance above the pin *t* to cause the fingers and cutters to preserve their same relative position in relation to each other when the cutting apparatus's vertical position is varied, which is a great disideratum to the perfect working of this class of harvesters.

On one side of stud E projects a plate, N, in which is formed a circular vertical slot, O, into which the set-screw in lever I works.

On the outer side of frame A is formed a retaining-finger, *c*, (see Fig. 1,) which drops into grooves in the end of shaft D and retains it longitudinally in such position as to hold the main gear *b* in or out of mesh with pinion *a*.

The operation of my improved machine will readily be seen to be as follows, viz: When the cutting apparatus is to be put in motion the gear *b* is placed in gear with pinion *a*, and there held by dropping clutch *c* in the proper groove in shaft D, and when out of motion in the other groove in shaft D for keeping it out. As all the working parts of my machine either lie parallel with each other, or at right angles to each other, or nearly so, it will readily be seen that the heel of the finger-bar C, the vibrating end of the hinged or adjustable coupling-arm Q, and cutter-driving pitman R will be at the same angle to the cutters' driving crank-shaft, whether on the ground for mowing or raised above it for reaping, and thereby all twist or strain in any of the working parts is prevented, which is of great value in this class of machines; and, also, it will be seen that the guard-fingers always occupy the same horizontal position relative to the ground, whether on it for mowing or above it for reaping, and that when the machine is used for mowing the heel of the finger-bar and vibrating of the hinged or adjustable coupling-arm will, independently of the main frame, rise and fall, according to the surface over which the finger-bar passes, and be limited in its extent of vibration by the length the vertical slot O is made; and, also, it will be observed, that the attendant can at pleasure, by tightening the set-screw *d*, hold the heel of the finger-bar at various distances above the ground for reaping or moving the machine from placing to place, as illustrated at Fig. 3; and it will be further understood that the fingers and cutters maintain the same relative relation to each other, whether the finger-bar be on the ground for mowing, or raised above it for reaping, when the main frame occupies the same longitudinal and vertical position, which is of great practical value, as without it no machine can be made to work properly; and, further, it will be seen that by having my finger-bar extend no farther from the fingers than the shoe or shield does, and by the shoe forming a guide for the heel of the cutter-bar and running forward of and above the points of the fingers, I avoid the difficulty of dragging the cut grass forward by the heel of the cutter and finger bar when mowing; and, again, it will be seen, that by the employment of a divider at the end of the finger-bar, which is of greater width in front of the finger-bar than one of the fingers, and which has no other connection with the main frame than that derived through the finger-bar, and which is brought to a point both vertically and horizontally, the grass or grain to be cut will be better divided and separated from that to be left standing than by machines of this class as heretofore constructed with which I am acquainted.

The hinged or adjustable coupling-arm Q is made broad for giving it lateral strength against being strained or thrown out of its proper parallelism.

The tongue of the machine may be secured to the main frame A, on either side of the main wheel B, or in a line with it, in whichever position will best conduce to the proper balancing and preventing side draft in the machine.

It will be seen that by the arrangement of levers by which the motion of crank L is conveyed to the cutter-bar the latter is caused to reciprocate or slide four times (that is twice one way and twice the other) to one revolution of crank L.

I do not wish to be understood as claiming broadly, neither the retaining of the guard-fingers of a harvester in parallel lines of motion while the finger-bar rises and falls, nor the feature of limiting the motion of the finger-bar, nor a device for holding the cutting apparatus above the ground.

To recapitulate, the following may be understood as explaining the several features of novelty in operation and construction of and practical advantages arising from my invention.

By the combination of the finger-bar with the coupling-arm Q and the main frame of the machine, the whole arranged substantially as before described, it will be seen that the finger-bar, in having its position (relatively to the main frame) changed, is moved always in such a manner that its forward and rear edges move in vertical planes, and so that its fingers move up and down the same distance at both ends, always being parallel with the ground, and so that the finger-bar is at the same time shifted slightly longitudinally, in consequence of the coupling-arm's end vibrating in an arc of a circle; and it will be further seen that while the cutting apparatus is capable of rising and falling in the manner just explained its extent of motion is limited by means of the pin *d* sliding in slot *o*; and it will be understood that in lieu of the pin *d* and slot *o* limiting the extent of vertical play to the vibrating end of arm Q, (which carries the finger-bar,) any other equivalent device may be employed; and it will be furthur seen that by tightening or setting the pin or screw *d* fast at any given point in slot *o* the finger-bar will be retained rigidly at any given elevation above the ground for reaping or for moving the machine from place to place.

It will further be seen that although the finger-bar is connected to the end of the vibratable coupling-arm Q, and hence in rising and falling has its position longitudinally changed relatively to the main frame, the relation of the cutter-bar to the finger-bar is not materially altered, because the heel of the finger-bar moves in the arc of a large circle, the center of which is nearly coincident with the center of pin in outer end of the pitman which vibrates the cutter-bar.

It will be understood that the shoe C′ is so arranged with the finger-bar that its side comes even with the heel of said finger-bar, and that it has formed in it a slot to guide the heel of the cutter-bar; and said shoe is so formed as to run in advance of and above the points of the fingers and press down the cut grass, and thus prevents entanglement with the heels of the finger and cutter bars; and it will be seen that the coupling-arm Q carries the shoe C′ up and down in an arc sidewise, but its back and front ends equal distances vertically.

Having described the construction and operation of the several features of my invention, what I claim therein as new, and desire to secure by Letters Patent, is—

1. The combination of the main frame A, carrying the cutting apparatus, and the finger-bar C, with the vibratable coupling-arm Q, the whole constructed and operating substantially as hereinbefore described, and for the purpose set forth.

2. In combination with the main frame A, vibratable coupling-arm Q, finger-bar C, shoe or shield C′, upright post P, arm I, hinge-pins *u* and *v*, the guiding-slot *o*, and set-screw *d*, or their equivalent, the whole arranged and operating as hereinbefore specified, for each or all of the purposes set forth.

3. The combination of the main frame A, finger-bar C, and cutter-bar Y, when the finger-bar is connected to the main frame by the vibratable coupling-arm Q, and the whole is arranged so that the relation between the finger and cutter bars is not materially changed in raising and lowering the cutting apparatus, substantially as hereinbefore described.

4. The combination of the main frame A, shoe or shield C′, and the vibratable coupling-arm Q, or its equivalent, when the whole are constructed and operate substantially as specified, for the purpose set forth.

5. The combination of the short finger-bar C and the shoe or shield C′, connected to the main frame by a hinged coupling-arm, with the main frame A, when the several parts are constructed, arranged, and operate in the manner and for the purposes specified.

6. The combination of the short finger-bar C, the shoe C′, divider $g^2$, and main frame A, when the said finger-bar, shoe, and divider are each constructed in the peculiar manner specified, and the whole arranged together and with the main frame, as and for the purposes herein described.

In testimony whereof I have hereunto set my hand and affixed my seal this 27th day of March, 1860.

JACOB SWARTZ. [L. S]

Witnesses:
HENRY A. SWARTZ,
ABRAM S. SWARTZ.